United States Patent Office 2,890,023
Patented June 9, 1959

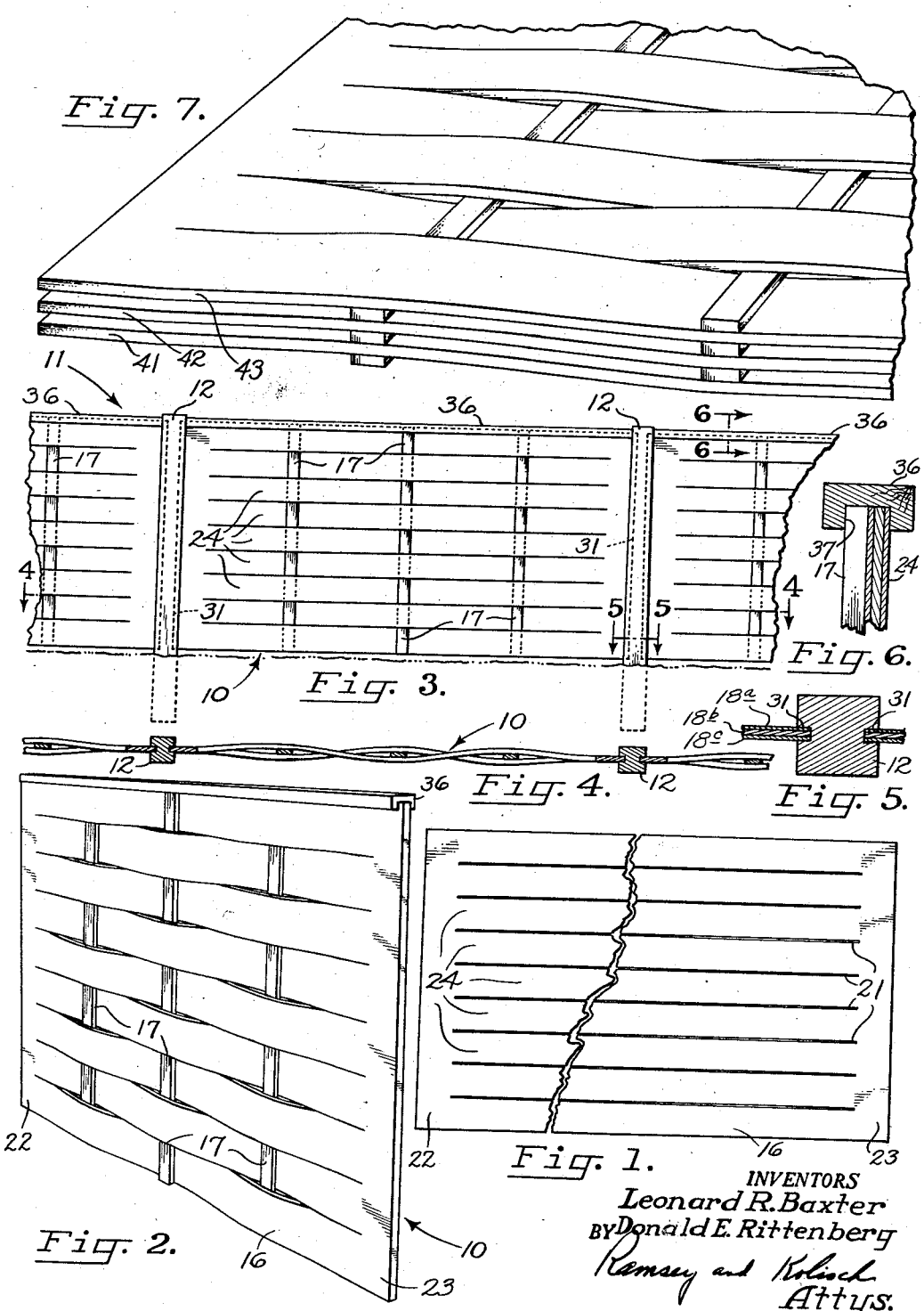

2,890,023

WOVEN FENCES

Leonard R. Baxter and Donald E. Rittenberg, Portland, Oreg.

Application February 24, 1958, Serial No. 717,044

6 Claims. (Cl. 256—19)

This invention relates to fences, gates and similar partitions. It simulates woven fences, gates and panels, but is substantially stronger, is maintained in overall dimensions and against warping and skewing, is compact and strong, and is prestressed to resist lateral pressures to which such fences and gates may be subject.

One of the principal objects of the invention is to produce panel sections made of cross-bonded, multi-ply plywood panels. The panels are cut with a plurality of strips formed over their central areas, with the margins of the panel unbroken and continuous. These margins provide an encompassing framework about the central strips, joining the ends of the strips. The central or joined strips have interwoven or interlaced therewith separate cross strips which extend crosswise of the major dimension of the joined strips. The interlacing of the cross strips thus produces a woven effect due to the fact that they are passed alternately under and over successive joined strips. Such weaving action of the transverse or cross strips through the central cut areas produces flexure of the central or joined strips, and the flexure of these latter strips is substantially equal and opposite. Inasmuch as the panels are made from a single sheet of plywood, the stresses produced by opposite flexure set up obliquely disposed stress lines which are resisted and confined by the margins of the panel to produce prestressing and cross-bracing within the panel itself.

This construction is to be contrasted with woven fences which comprise interlaced separate strips, and which are devoid of pre-stressing within a common member. Maintenance of dimension and form is not assured in the latter type of woven panels, and at the ends of any strips thus interwoven, there is angular displacement. It is desirable if not necessary that these be joined by some ancillary clips so that they may be secured to or within a post to support the panels in a fence or gate. Usually it is necessary to pin or clip the interlaced members at each place that they cross each other to assure stability.

A further practical advantage of the invention is that the sheets of plywood from which the panel sections are constructed may be of structural grade, while any strips used in making woven fence panels in the past have had to be of top-grade so as to resist fracture and splitting. This is so because the various sheets of veneer stock making up the panel are laid up with the grain in alternate successive sheets cross-bonded with the grain of adjacent sheets. The cross-grain construction resists fracture and warping. Thus, even if there are imperfections in the several sheets of veneer of a plywood sheet, the sheet itself will withstand pre-stressing and flexure produced by interlacing cross strips therein. Later, when the panels are incorporated in a fence or gate, the panels resist, effectively, the external stresses produced by wind and other elements without change in their overall squareness or dimension.

Another practical advantage of structures made in accordance with this invention, and particularly of the panels thereof, is that the panels may be stored or shipped flatwise one upon the other. The sheets of plywood, when cut, occupy no more space than uncut sheets of plywood, and thus may be shipped and stored with equal facility. If the panels are interwoven with cross strips in a factory and then shipped, they are deflected in the superimposed layers to an equal degree, and thus the portions that are bent downwardly nest in similar portions in an underlying layer, and the portions that are bent upwardly nest similarly in the overlying layers which are also correspondingly bent. This tends to prevent the panel sections from slipping laterally during shipment or in storage, and diminishes the overall bulk of a stack of the panel sections due to such nesting or interlocking action.

Fences and gates made in accordance with the invention lend themselves to the do-it-yourself householder because they remain square, true to dimension and flat at their margins. Posts may be set at predetermined modules and the panels may be secured thereto without requiring unusual skill.

Further and other details of the invention are hereinafter described with reference to the accompanying drawings, in which:

Fig. 1 is a front view of a plywood panel after cutting and with a plurality of strips extending over a central area thereof;

Fig. 2 is a perspective view of a completed panel section;

Fig. 3 is a front view of a fence or enclosure, constructed with vertical posts mounting a series of panel sections of the type illustrated in Fig. 2;

Fig. 4 is a section view along the line 4—4 of Fig. 3, showing the deformation of the strips in the panel after fabrication;

Fig. 5 is a section view, slightly enlarged, along the line 5—5 in Fig. 3;

Fig. 6 is a section view, slightly enlarged, along the line 6—6 in Fig. 3; and

Fig. 7 illustrates a plurality of panel sections stacked together one upon another.

Referring now to the drawings for a description of the invention, and more particularly to Figs. 1, 2 and 3, 10 indicates a panel section for an enclosure 11. The enclosure in this instance is illustrated as a fence, although it is understood that it could also be a gate, or a partition. Panel section 10 in the embodiment illustrated is of rectangular shape, and has its vertical end edges securely fastened in Fig. 3 to upstanding vertical posts 12.

The panel section includes a panel base 16, and one or more elongated cross strips or inserts. The panel base and the cross strips are made of material having substantially the same thickness, although it is appreciated that variations may be made in thickness without departing from the spirit of the invention.

Panel base 16 is plywood or other laminated veneer sheet material, having plural sheets of veneer cross-bonded, one to another. Thus in Fig. 5, a three-ply piece of plywood is shown having veneer layers 18a, 18b, and 18c. A laminated construction for panel base 16 enables the use of structural grade plywood, without incurring danger of splitting, warping, or fracturing of the panel after fabrication into a panel section.

The panel base is cut with a series of elongated saw kerfs 21 which extend through the thickness of the panel base and along one dimension of the panel. The saw kerfs terminate short of the end edges of the panel base to leave at each end an imperforate end margin 22 and 23, respectively. These end margins and the top and bottom edges of the panel constitute a continuous and unbroken frame section extending around the periphery of panel base 16. While the saw kerfs are shown as lineal cuts, they may be jagged, curved, or otherwise varied from a straight line. The cuts define a series of panel strip portions 24 lying side by side in the panel base. The cuts shown extend generally longitudinally and horizontally along the length of the panel base when it is mounted, as is shown in Fig. 3, in an upright position. The cuts may be made transversely of the length of the panel base, or extend vertically upwardly from the ground, if desired. In the manufacture of a gate or the short side of a partition, for instance, it may be advantageous to mount a panel section with its longest dimension extending upwardly from the ground, and have the cuts made in the panel transversely of its length.

After cutting the panel, cross strips 17 are woven or interlaced between the panel strips 24, whereby they are exposed first on one side and then on the other side of the panel. In the panel sections of Fig. 2, the cross strips extend between top and bottom parallel edges of the panel, with their ends more or less flush with these edges. When more than one cross strip is used, for any given panel strip 24, adjacent cross strips are exposed on opposite sides of the panel base. In this way a true woven effect is produced, and greater strength and rigidity is achieved over the entire panel section.

With reference now to Figs. 3, 4, 5 and 6, a panel section may be mounted in a fence by fitting the ends thereof snugly within grooves 31 extending vertically along the opposed faces of adjacent pairs of posts 12. The panel section may be glued, nailed, or otherwise fastened to the post, as desired. In some cases it may be desirable to leave the panel section more or less loosely mounted in the posts. In the event that it is desired to nail a panel section in place, nails may be inserted directly through the post and into the imperforate end margins of the panel section.

According to one embodiment of this invention, extending along one of the edges of the panel section (the top horizontal edge of the panel section in Figs. 2, 3 and 6) is an elongated cover strip or rail 36. Cover strip 36 has an elongated groove 37 extending longitudinally along the underside of the strip. The groove is substantially as wide as the thickness of the panel base plus that of the cross strip. The groove is snugly fitted over the top edge of the panel section and engages the top ends of the cross strips closely along the top of the panel. If two or more cross strips are included, alignment is produced between the cover strip and the panel section. The cover strip adds strength and sightliness to the panel section.

Cover strip 36 terminates short of the edges of the panel, as can best be seen in Fig. 2. Thus when a panel section is embodied into a fence, and the edges thereof are inserted in slots or grooves 31, the ends of the cover strip fit snugly between the inner or opposed faces of adjacent fence posts 12, and constitute stops or spacers therebetween. If desired, another cover strip may be inserted along the lower edge of the panel, that is, the edge of the panel which is just clear of the ground in Fig. 3.

The panel sections are readily fabricated either at the building site of the enclosure, or at a central point of manufacture. In the event of the latter, completed panel sections are conveniently shipped in bundles as illustrated in Fig. 7. Referring to this figure, several panel sections 41, 42, and 43 are stacked one over another with upwardly bent portions of the panel strip portions of an upper section stacked over the upwardly bent portions of the panel strip portions of a lower section. Similarly, the downwardly bent portions of the panel strip portions of an upper panel section are stacked over the downwardly bent portion of the panel strip portions of a lower panel section and nest therein. When a plurality of panel sections are stacked one over another, the separation between the panel sections equals approximately the width of the cross strips. In this way the panel sections nest one within another, both top and bottom. The nesting or interlocking of the panels prevents laterally shifting thereof during transport, and reduces the overall bulk of a given number of panel sections.

In summary, it will be seen that this invention contemplates fences or partitions having considerable strength because of the pre-stressing of the strips in the common base panel 16. The imperforate margin or frame section encompassing the panel strips accommodates pre-stressing of the strips by locking in said stresses, at the same time prevents shifting or skewing of the strips, and change in the overall dimension of a panel strips, and change in the overall dimension of a panel section. The finite or fixed length of each of the panel sections enables it readily to be mounted between fence posts of fixed modular spacing.

This application is a continuation-in-part of a previously filed application entitled "Woven Fences and Method of Producing," Serial No. 658,079, filed May 9, 1957, now abandoned.

It is claimed and desired to secure by Letters Patent.

1. In an enclosure, a fence panel section comprising a unitary plywood panel of plural sheets of cross-bonded veneer, said panel having a pair of opposed, substantially straight bounding edges for mounting the panel and a plurality of elongated narrow saw kerfs cut through the thickness of the panel over a central area thereof extending between said bounding edges but terminating short of said bounding edges, said kerfs defining spaced strips separated by said kerfs, the marginal portions of said panel being continuous and constituting a frame section surrounding said spaced strips and joining them together, and at least one elongated cross strip mounted in the panel transversely of said saw kerfs, said cross strip being interlaced with said joined strips by alternately overlying and underlying successive strips.

2. In an enclosure, a fence panel section comprising a unitary plywood panel of plural sheets of cross-bonded veneer, said panel having a pair of opposed, substantially straight bounding edges for mounting the panel and a plurality of elongated saw kerfs cut through the thickness of the panel over a central area thereof extending between said bounding edges but terminating short of said bounding edges, the marginal portions of said panel being continuous and constituting a frame section surrounding said spaced strips and joining them together, and a plurality of cross strips mounted in said panel transversely of said saw kerfs, said cross strips being interlaced with said joined strips by alternately overlying and underlying successive strips, adjacent cross strips being exposed along any given one of the joined strips on opposite sides of the panel.

3. In an enclosure, a fence panel section comprising a unitary plywood panel of plural sheets of cross-bonded veneer, said panel having a pair of opposed, substantially straight bounding edges for mounting the panel and a plurality of substantially parallel and equally spaced elongated saw kerfs cut through the thickness of the panel over a center area thereof and extending between said bounding edges, said saw kerfs defining spaced strips of substantially equal width separated by said kerfs, said kerfs terminating short of said bounding edges of the panel thereby to leave an imperforate margin around the periphery of the panel joining the ends of the strips together, and a plurality of elongated cross strips mounted in said panel transversely of said saw kerfs, said cross strips extending through pairs of kerfs so as to be exposed alternately first on one side and then on the other side of said panel, adjacent cross strips being exposed along any given one of the joined strips on opposite sides of said panel.

4. A fence enclosure comprising a plurality of spaced vertical posts, adjacent posts each having wall portions defining an elongated vertical groove formed therein facing inwardly between the posts, a unitary plywood panel of plural sheets of cross-bonded veneer extending between adjacent posts and having vertical end edges seating tightly in said vertical grooves, said panel having a plurality of elongated narrow cuts formed therein extending generally in a horizontal direction cut through the thickness of the panel but terminating short of the vertical end edges of the panel thereby to leave an imperforate end margin at each of its vertical end edges, said end edges tightly fitting within said grooves and in direct abutting contact with the wall portions defining the grooves, and at least one elongated strip mounted in the panel transversely of said cuts, said strip extending through pairs of cuts to be exposed alternately first on one side and then on the other side of said panel.

5. For assembly into a fence, a plurality of posts, a unitary plywood panel of plural sheets of cross-bonded veneer, said panel having a pair of opposed, substantially straight bounding edges for mounting the panel and a plurality of elongated saw kerfs cut through the thickness of the panel over a central area thereof extending between said bounding edges but terminating short of said bounding edges, said kerfs defining spaced strips separated by said kerfs, the marginal portions of said panel being continuous and constituting a frame section surrounding said spaced strips and joining them together, and at least one elongated strip insert having a width substantially less than the length of the shortest of said kerfs for mounting through said kerfs transversely thereof.

6. A fence enclosure comprising a plurality of spaced vertical posts, adjacent posts each having wall portions defining an elongated vertical groove formed therein facing inwardly between the posts, a unitary plywood panel of plural sheets of cross-bonded veneer extending between adjacent posts and having vertical end edges sitting in said vertical grooves and in direct abutting contact with the wall portions defining the grooves, said panel having a plurality of elongated saw kerfs cut through the thickness of the panel over a central area thereof and terminating short of the edges of the panel, said saw kerfs defining spaced horizontal strips separated by said kerfs, the marginal portions of said panel being continuous and constituting a frame section surrounding said spaced strips and joining them together, at least one elongated cross strip mounted in the panel transversely of said joined strips, said cross strip being interlaced with said joined strips and exposed alternately first on one side and then on the other side of said panel, said cross strip having an upper end which terminates adjacent the top edge of the panel, and an elongated cover strip fitting over said top edge clamping said upper end of said cross strip adjacent said top edge.

References Cited in the file of this patent

UNITED STATES PATENTS

| | | |
|---|---|---|
| 849,421 | O'Brien | Apr. 9, 1907 |

FOREIGN PATENTS

| | | |
|---|---|---|
| 451,371 | Great Britain | Aug. 5, 1936 |